US012422552B2

(12) United States Patent
Ohata et al.

(10) Patent No.: US 12,422,552 B2
(45) Date of Patent: Sep. 23, 2025

(54) SYNCHRONIZATION DEVICE, SYNCHRONIZATION METHOD, AND SYNCHRONIZATION PROGRAM

(71) Applicant: DENSO CORPORATION, Kariya (JP)

(72) Inventors: Ryusuke Ohata, Kariya (JP); Jun Kogami, Kariya (JP)

(73) Assignee: DENSO CORPORATION, Kariya (JP)

( * ) Notice: Subject to any disclaimer, the term of this patent is extended or adjusted under 35 U.S.C. 154(b) by 842 days.

(21) Appl. No.: 17/658,073

(22) Filed: Apr. 5, 2022

(65) Prior Publication Data
US 2022/0229184 A1 Jul. 21, 2022

Related U.S. Application Data

(63) Continuation of application No. PCT/JP2020/037853, filed on Oct. 6, 2020.

(30) Foreign Application Priority Data

Oct. 8, 2019 (JP) .................. 2019-185388

(51) Int. Cl.
*G01S 17/86* (2020.01)
*G01S 17/08* (2006.01)

(52) U.S. Cl.
CPC .............. *G01S 17/86* (2020.01); *G01S 17/08* (2013.01)

(58) Field of Classification Search
CPC ......... G01C 21/28; G01S 17/08; G01S 17/86; G01S 17/894; G01S 17/931; G01S 7/4911; G01S 7/4914; G01S 7/4918; G01S 7/497
See application file for complete search history.

(56) References Cited

U.S. PATENT DOCUMENTS

| | | | |
|---|---|---|---|
| 6,941,211 B1 | 9/2005 | Kuroda et al. | |
| 7,042,389 B2 * | 5/2006 | Shirai | G01S 13/867 |
| | | | 382/104 |
| 11,328,444 B2 * | 5/2022 | Yamazaki | G01C 3/14 |
| 2016/0291134 A1 | 10/2016 | Droz et al. | |
| 2017/0031032 A1 | 2/2017 | Garin et al. | |
| 2017/0366430 A1 * | 12/2017 | Seo | H04L 43/0852 |
| 2018/0149732 A1 | 5/2018 | Droz et al. | |
| 2020/0211219 A1 | 7/2020 | Yamazaki et al. | |

* cited by examiner

*Primary Examiner* — Hina F Ayub
(74) *Attorney, Agent, or Firm* — Maschoff Brennan

(57) ABSTRACT

A synchronization device includes a synchronization prediction unit, a change amount calculation unit, an image estimation unit, a difference extraction unit, and a determination unit. The synchronization prediction unit is configured to predict a synchronization error time between a radar sensor and an external camera. The change amount calculation unit is configured to calculate a change amount of the reflected wave image in a shutter frame of the external camera. The image estimation unit is configured to estimate the reflected wave image for a synchronization timing that is shifted from a start timing of the shutter frame by the synchronization error time. The difference extraction unit is configured to extract a difference by comparing the reflected wave image for the synchronization timing with the outside light image. The determination unit configured is to determine, based on the difference, whether to return to a step of predicting the synchronization error time.

18 Claims, 10 Drawing Sheets

SYNCHRONIZATION DEVICE, SYNCHRONIZATION METHOD, AND SYNCHRONIZATION PROGRAM

CROSS REFERENCE TO RELATED APPLICATION

The present application is a continuation application of International Patent Application No. PCT/JP2020/037853 filed on Oct. 6, 2020, which designated the U.S. and claims the benefit of priority from Japanese Patent Application No. 2019-185388 filed on Oct. 8, 2019. The entire disclosures of all of the above applications are incorporated herein by reference.

TECHNICAL FIELD

The present disclosure relates to a synchronization process.

BACKGROUND

In recent years, a radar sensor configured to acquire a reflected wave image according to reflected waves obtained by emitting electromagnetic waves and an external camera configured to acquire an outside light image according to outside light sensed from an outside are mounted in a vehicle.

SUMMARY

According to a first aspect of the present disclosure, a synchronization device is configured to perform a synchronization process for a radar sensor and an external camera mounted in a vehicle. The radar sensor is configured to acquire a reflected wave image according to reflected waves obtained by emitting electromagnetic waves, and the external camera is configured to acquire an outside light image according to outside light sensed from an outside of the vehicle. The synchronization device includes a synchronization prediction unit, a change amount calculation unit, an image estimation unit, a difference extraction unit, and a determination unit. The synchronization prediction unit is configured to predict a synchronization error time between the radar sensor and the external camera. The change amount calculation unit is configured to calculate a change amount of the reflected wave image in a shutter frame of the external camera. The image estimation unit is configured to estimate, based on the change amount calculated by the change amount calculation unit, the reflected wave image for a synchronization timing that is shifted from a start timing of the shutter frame by the synchronization error time predicted by the synchronization prediction unit. The difference extraction unit is configured to extract a difference between the reflected wave image for the synchronization timing estimated by the image estimation unit and the outside light image by comparing the reflected wave image for the synchronization timing with the outside light image. The determination unit is configured to determine, based on the difference extracted by the difference extraction unit, whether to return the synchronization process to a step of predicting the synchronization error time.

According to a second aspect of the present disclosure, a method is for performing a synchronization process for a radar sensor and an external camera mounted in a vehicle. The radar sensor is configured to acquire a reflected wave image according to reflected waves obtained by emitting electromagnetic waves, and the external camera is configured to acquire an outside light image according to outside light sensed from an outside of the vehicle. The method includes predicting a synchronization error time between the radar sensor and the external camera. The method includes calculating a change amount of the reflected wave image in a shutter frame of the external camera. The method includes estimating, based on the calculated change amount, the reflected wave image for a synchronization timing that is shifted from a start timing of the shutter frame by the predicted synchronization error time. The method includes extracting a difference between the estimated reflected wave image for the synchronization timing and the outside light image by comparing the estimated reflected wave image for the synchronization timing with the outside light image. The method includes determining, based on the extracted difference, whether to return the synchronization process to a step of predicting the synchronization error time.

According to a third aspect of the present disclosure, a computer program product is for performing a synchronization process for a radar sensor and an external camera mounted in a vehicle. The radar sensor is configured to acquire a reflected wave image according to reflected waves obtained by emitting electromagnetic waves, and the external camera is configured to acquire an outside light image according to outside light sensed from an outside of the vehicle. The computer program product includes instructions configured to, when executed by at least one processor, cause the at least one processor to predict a synchronization error time between the radar sensor and the external camera. The instructions are configured to, when executed by the at least one processor, cause the at least one processor to calculate a change amount of the reflected wave image in a shutter frame of the external camera. The instructions are configured to, when executed by the at least one processor, cause the at least one processor to estimate, based on the calculated change amount, the reflected wave image for a synchronization timing that is shifted from a start timing of the shutter frame by the predicted synchronization error time. The instructions are configured to, when executed by the at least one processor, cause the at least one processor to extract a difference between the estimated reflected wave image for the synchronization timing and the outside light image by comparing the estimated reflected wave image for the synchronization timing with the outside light image. The instructions are configured to, when executed by the at least one processor, cause the at least one processor to determine, based on the extracted difference, whether to return the synchronization process to a step of predicting the synchronization error time.

EMBODIMENTS

Comparative Example

In a comparative example of the present disclosure, time information about times when the reflected wave image and the outside light image are acquired is added to these images to synchronize the radar sensor and the external camera.

However, a delay of the image signals may occur in the path between the radar sensor, the external camera, and the processing circuit for performing the synchronization process. As a result, the time information added by the processing circuit receiving the image signals may include error from a time when the radar sensor and the external camera actually acquire the images.

Hereinafter, embodiments will be described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

Figure 1:
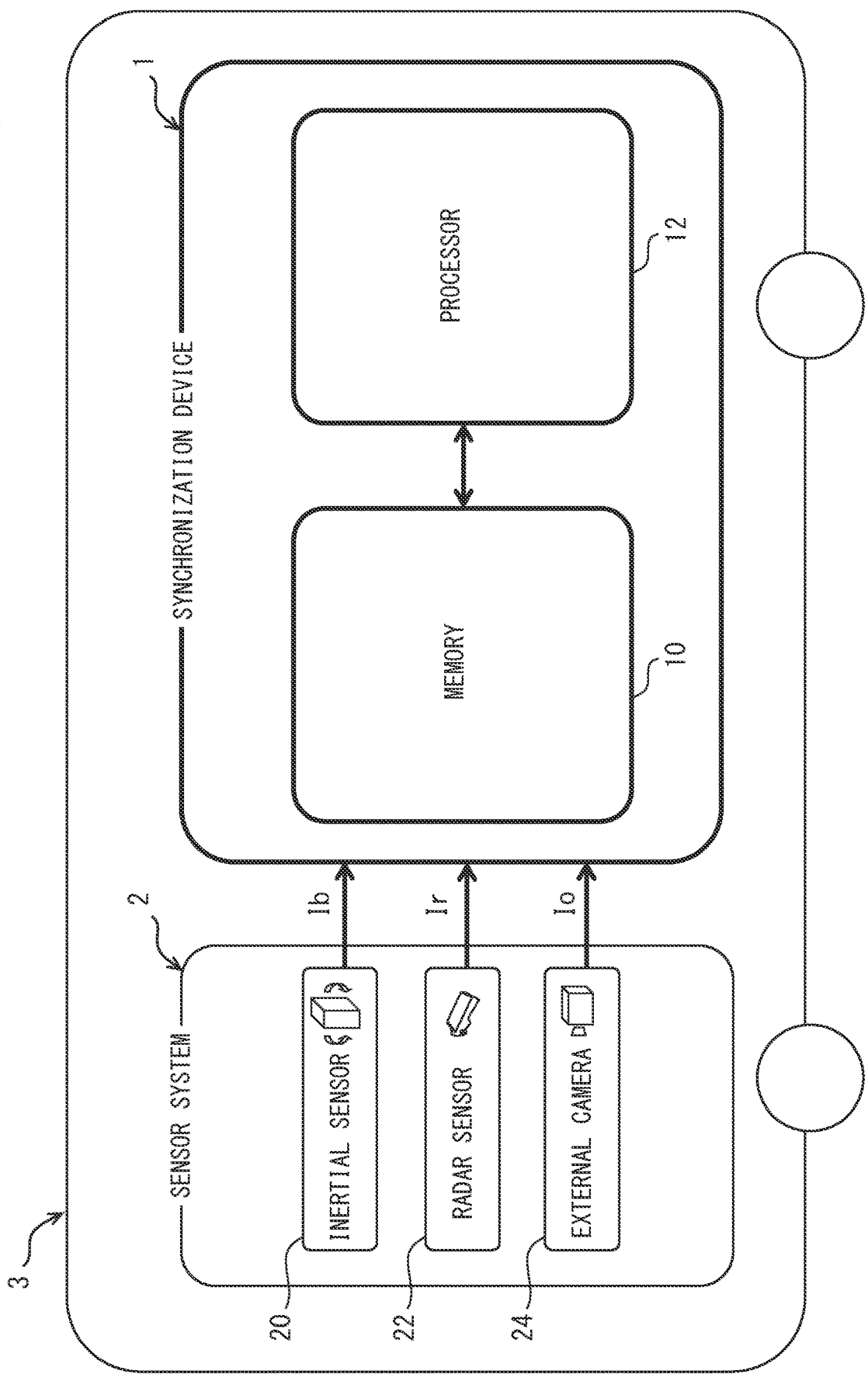
FIG. 1 is a block diagram showing an overall configuration of a synchronization device according to a first embodiment.

As shown in FIG. 1, a synchronization device 1 according to a first embodiment is mounted in a vehicle 3. The vehicle 3 is, for example, an advanced driver-assistance vehicle, an automated driving vehicle, or the like configured to travel based on a motion estimation such as a self-position estimation. In the following description, a left-right direction of the vehicle 3 on a horizontal plane is referred to as a horizontal direction, and a front-rear direction of the vehicle 3 on the horizontal plane is referred to as a front-rear direction. Further, a vertical direction of the vehicle 3 on the horizontal plane is referred to as a vertical direction.

Figure 2:
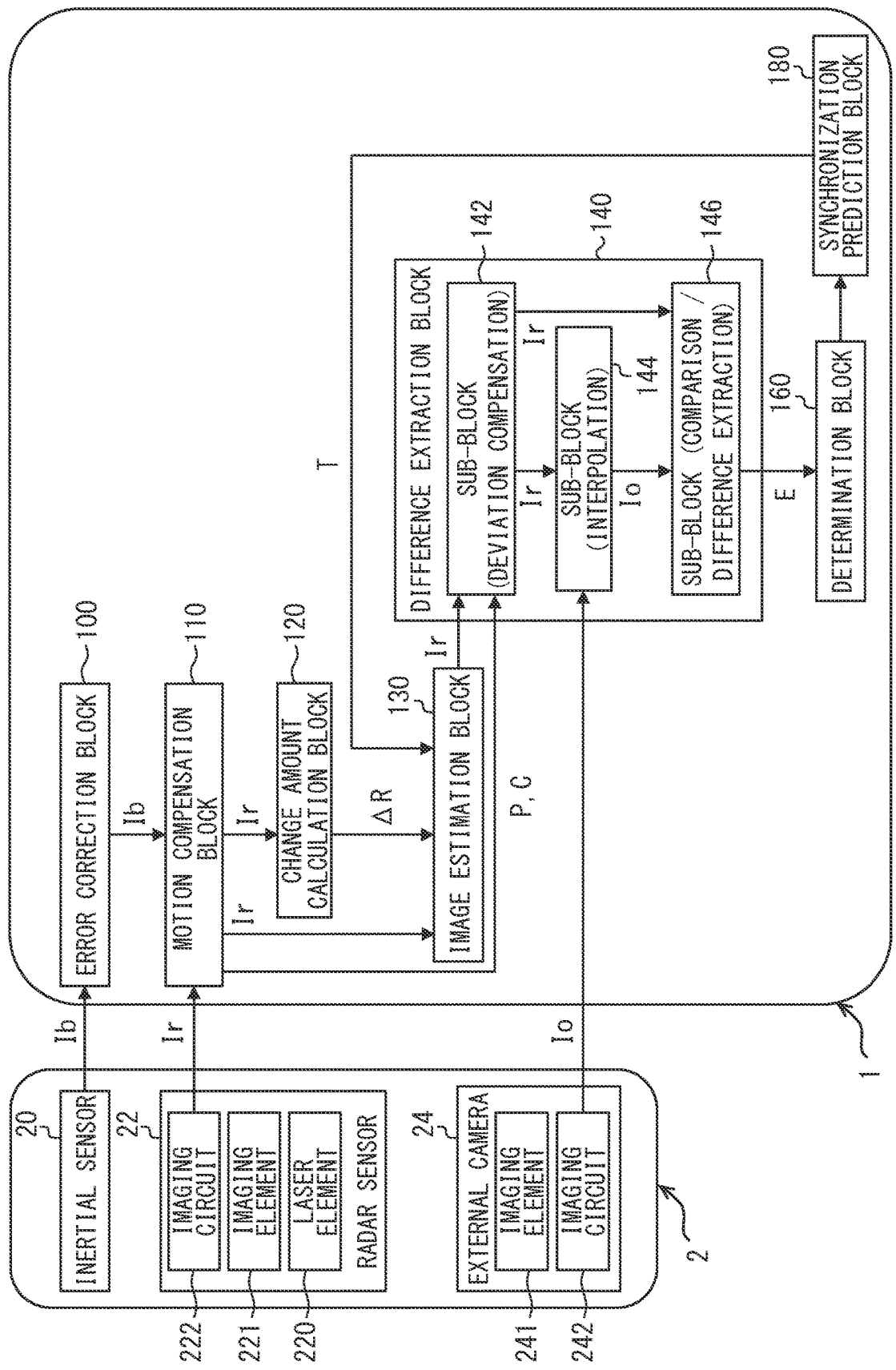
FIG. 2 is a block diagram showing a detailed configuration of the synchronization device according to the first embodiment.

A sensor system 2 is mounted in the vehicle 3 together with the synchronization device 1. As shown in FIGS. 1, 2, the sensor system 2 includes at least an inertial sensor 20, a radar sensor 22, and an external camera 24.

The inertial sensor 20 is, for example, so-called IMU (Inertial Measurement Unit) configured to acquire inertial information Ib that can be utilized for the motion estimation of the vehicle 3. The inertial sensor 20 is configured to acquire, as the inertial information Ib, at least one of an angle, an angular velocity, or an angular acceleration of the vehicle 3 around three axes including the front-rear direction, the horizontal direction, and the vertical direction. The inertial sensor 20 includes at least one of a gyro sensor or an acceleration sensor, for example.

The radar sensor 22 of the first embodiment is so-called LIDAR (Light Detection and Ranging/Laser Imaging Detection and Ranging) configured to acquire a reflected wave image Ir that can be utilized for the motion estimation of the vehicle 3. The radar sensor 22 is configured to acquire the reflected wave image Ir according to reflected waves obtained by emitting electromagnetic waves to an outside of the vehicle 3. As shown in FIG. 2, the radar sensor 22 includes a laser element 220, an imaging element 221, and an imaging circuit 222.

The imaging circuit 222 is configured to control an infrared laser light (hereinafter, referred to a laser light) that is emitted as the electromagnetic waves from the laser element 220 to the outside of the vehicle 3 in the form of a pulsed beam that is intermittent in accordance with changes of the beam steering angle in the horizontal direction. Along with this emission of the laser light, the imaging circuit 222 captures the image in the rolling shutter mode by exposing and scanning horizontally adjacent one or more vertical pixel lines of the imaging elements 221 according to the beam steering angle changing in the horizontal direction. The imaging circuit 222 is configured to acquire the reflected wave image Ir by converting, to data for each pixel associating with corresponding beam steering angle, a distance value to the reflected point corresponding to the time of flight of the reflected light (reflected waves) sensed by exposed pixels of the imaging element 221. The time of flight of the reflected light is calculated from the time when the laser light is emitted and the time when the reflected light is sensed by the pixels.

The reflected wave image Ir may include the luminance value corresponding to the intensity of the reflected light (reflected waves) sensed by each exposed pixel of the imaging element 221. The luminance value is converted by the imaging circuit 222 to data in association with the beam steering angle corresponding to each pixel. The imaging element 221 may be configured to capture an image by sensing the external light from the outside of the vehicle 3 during the interval of the intermittently emitted laser light. The reflected wave image Ir may include the luminance value corresponding to the intensity of the external light sensed by each exposed pixel of the imaging element 221. The luminance value is converted by the imaging circuit 222 to data in association with the beam steering angle corresponding to each pixel.

The external camera 24 is a so-called in-vehicle camera configured to acquire an outside light image Io that can be utilized for the motion estimation of the vehicle 3. The external camera 24 is configured to acquire the outside light image Io in accordance with the external light from the outside of the vehicle 3. The external camera 24 includes the imaging element 241 and the imaging circuit 242.

The imaging circuit 242 captures the image in the global shutter mode by exposing and scanning the entire vertical pixel lines of the imaging element 241 at a time. The imaging circuit 242 is configured to acquire the outside light image Io by converting, to data in association with the pixel angle corresponding to each pixel, the luminance value corresponding to the intensity of the outside light sensed by each exposed pixel of the imaging element 241.

Figure 3:
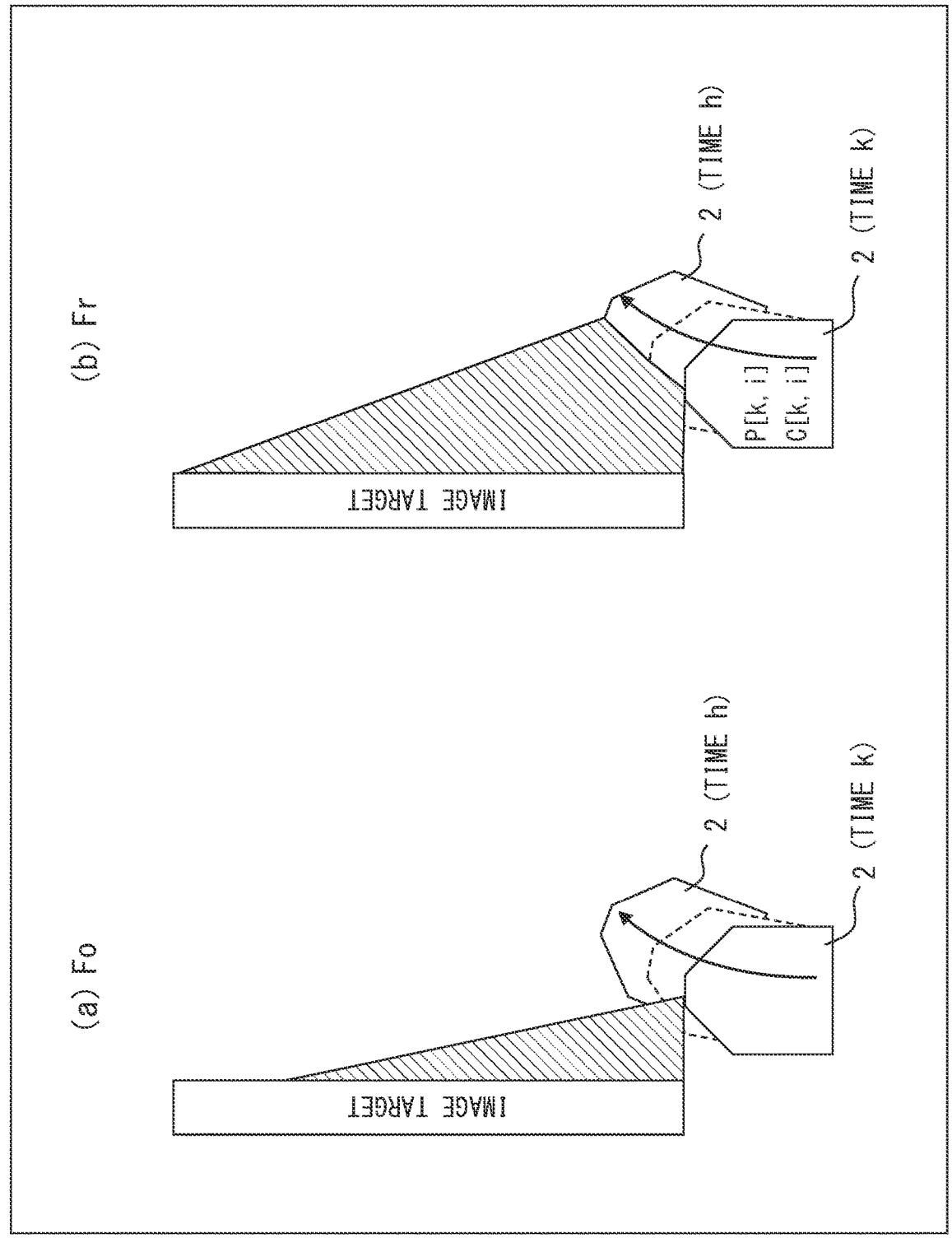
FIG. 3 is a schematic diagram illustrating an external camera (a) and a radar sensor according to the first embodiment.
Figure 4:
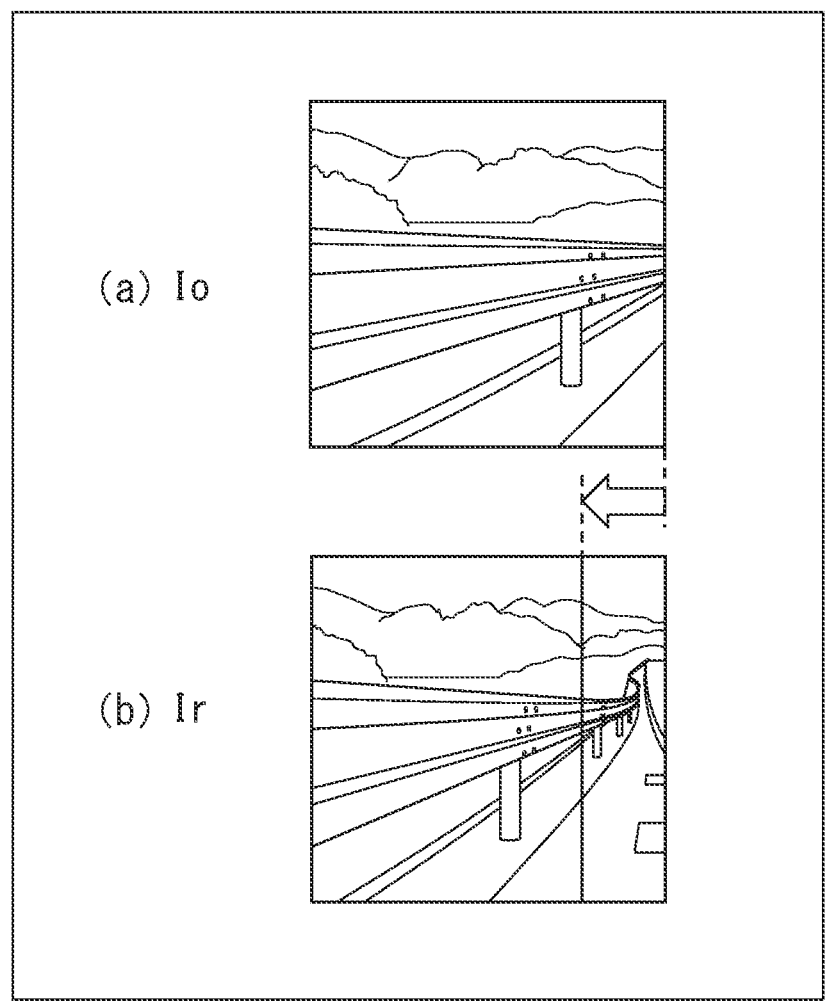
FIG. 4 is a schematic diagram illustrating an outside light image (a) and a reflected wave image (b) according to the first embodiment.

For the global shutter frame Fo when the entire scanning lines are scanned by the external camera 24, a frame period shorter than that of the rolling shutter frame Fr when the entire scanning lines are scanned by the radar sensor 22 and a start timing close to that of the rolling shutter frame Fr are set. As a result, when the start timings of the frames Fo, Fr are precisely synchronized with each other as shown in FIG. 3, the reflected wave image Ir of a range of the outside wider than that of the outside light image Io is acquired and compressed as shown in FIG. 4. Note that FIG. 4 does not show the images Ir, Io as it is, but schematically show the views captured in the images Ir, Io.

As shown in FIG. 1, the synchronization device 1 according to the first embodiment is connected with the components 20, 22, 24 of the sensor system 2 through at least one of LAN (Local Area Network), a wire harness, an internal bus, or the like. The synchronization device 1 includes at least one dedicated computer. The dedicated computer included in the synchronization device 1 may be an ECU (Electronic Control Unit) of a locator configured to estimate the position of the vehicle 3. The dedicated computer included in the synchronization device 1 may be an ECU configured to control an advanced driving assistance or an automated driving of the vehicle 3. The dedicated computer included in the synchronization device 1 may be an ECU configured to control a communication between the vehicle 3 and an external device.

The synchronization device 1 including such dedicated computer has at least one memory 10 and at least one processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one type of, for example, a CPU (Central Processing Unit), a GPU (Graphics Processing Unit), an RISC (Reduced Instruction Set Computer) CPU, and so on. The processor 12 executes multiple commands included in a synchronization program stored in the memory 10. Accordingly, the synchronization device 1 builds multiple functional blocks for performing a synchronization process for the radar sensor 22 and the external camera 24 as shown in FIG. 2. In the following description, the synchronization process for the radar sensor 22 and the external camera 24 is referred to as the synchronization process.

The functional blocks built by the synchronization device 1 includes an error correction block 100, a motion compensation block 110, a change amount calculation block 120, an image estimation block 130, a difference extraction block 140, a determination block 160, and a synchronization prediction block 180.

The latest inertial information Ib acquired by the inertial sensor 20 at a time k is input to the error correction block 100. The latest bias error B that is estimated using at least one of various navigation calculations for the time k is input to the error correction block 100. The time k is the start timing of the global shutter frame Fo (see FIG. 3).

Based on the above inputs, the error correction block 100 is configured to correct the latest inertial information Ib using the bias error B. This correction is realized by subtracting the bias error B from the inertial information Ib.

Figure 5:
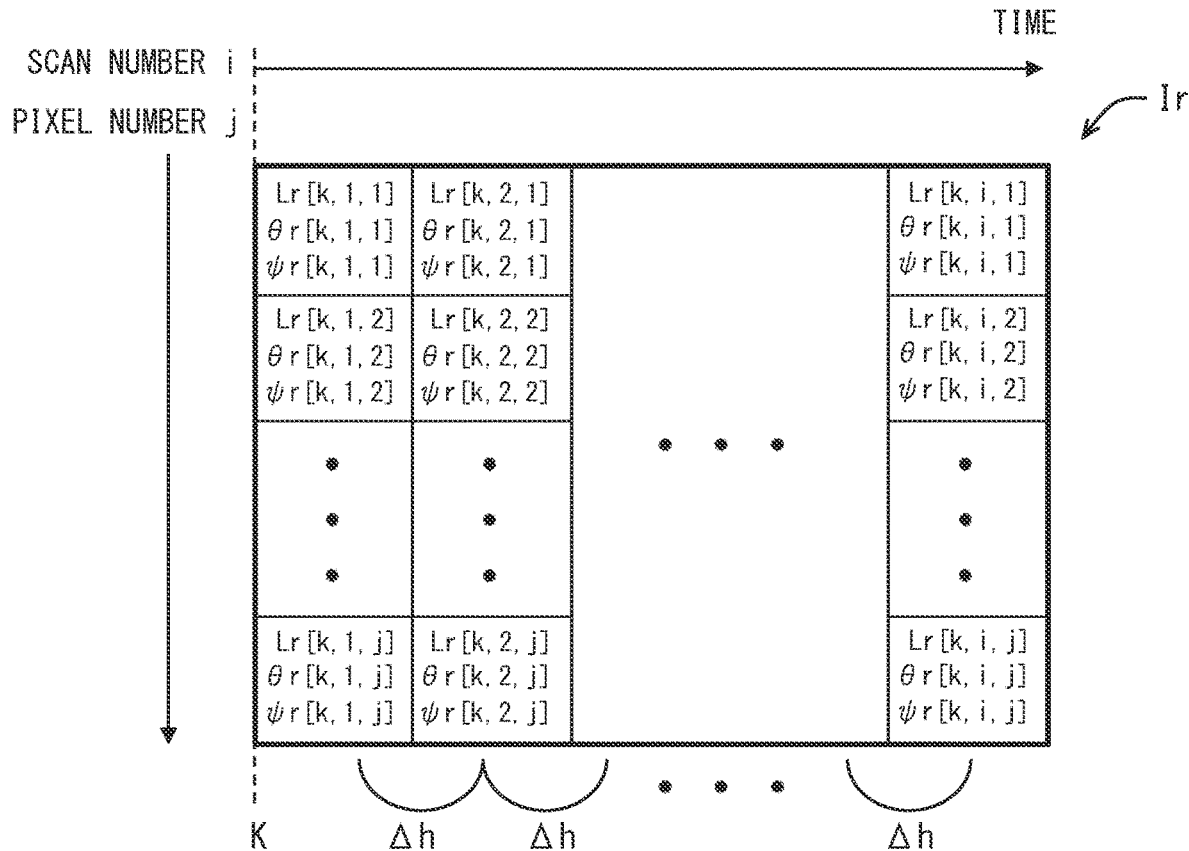
FIG. 5 is a schematic diagram for explaining a motion compensation block according to the first embodiment.

The corrected inertial information Ib at the time k which is corrected by the error correction block 100 using the bias error B is input to the motion compensation block 110 shown in FIG. 2. The latest reflected wave image Ir acquired by the radar sensor 22 in the global shutter frame Fo whose start timing is the time k is also input to the motion compensation block 110. As shown in FIG. 5, the latest reflected wave image Ir includes, as the latest data values, the distance value $Lr[k, i, j]$, the beam steering angle $\theta r[k, i, j]$, and $\psi r[k, i, j]$ for each pixel.

Here, [k, i, j] are indexes for identifying the latest data values $Lr$, $\theta r$, $\psi r$, where "k" is the time k, "i" is the scan number i representing the row number and the scanning order, and "j" is the pixel number j in the scan number i. That is, $Lr[k, i, j]$, $\theta r[k, i, j]$, $\psi r[k, i, j]$ are input to the motion compensation block 110 as the latest data values of the scanning line having the scanning timing of the time h represented by the following formula 1 (see FIG. 3).

$$h \approx k + (i-1) \cdot \Delta h \quad \text{[Formula 1]}$$

Figure 6:
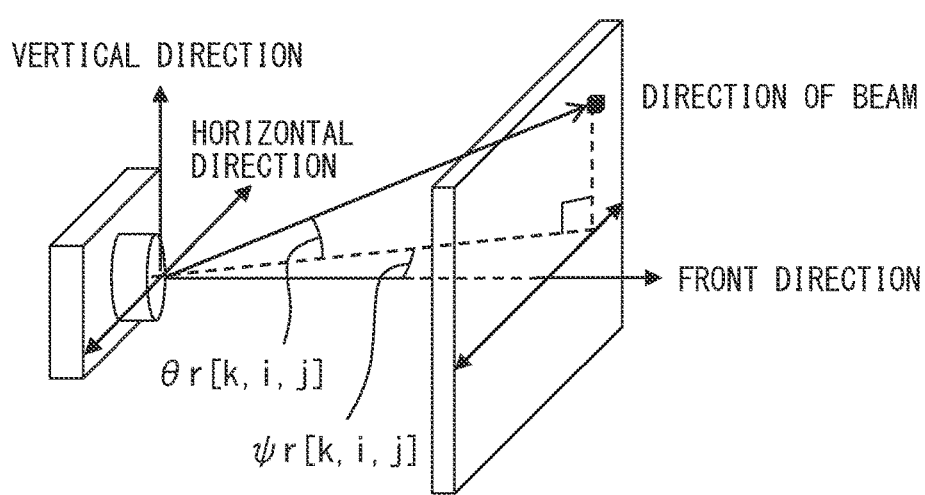
FIG. 6 is a schematic diagram for explaining the motion compensation block according to the first embodiment.

In the formula 1, the time h including the synchronization error time T between the start timings of the frames Fo, Fr is approximately defined using the time k, the scan number i, and the time difference $\Delta h$ between the scanning lines (see FIG. 5). As shown in FIG. 6, $\theta r[k, i, j]$ represents the beam steering angle in the vertical direction of the laser light that is emitted by the laser element 220 and sensed at the time h by the pixel of the imaging element 221 having the numbers i, j. $\psi r[k, i, j]$ represents the beam steering angle in the horizontal direction of the laser light that is emitted by the laser element 220 and sensed at the time h by the pixel of the imaging element 221 having the numbers i, j.

According to these inputs, the motion compensation block 110 compensates the latest data values of the reflected wave image Ir for the movement amount of the vehicle 3 during the global shutter frame Fo based on the inertial information Ib that was corrected using the bias error B. Specifically, the motion compensation block 110 calculates the position $P[k, i]$ of the vehicle 3 and the direction cosine matrix $C[k, i]$ at the time k using at least one of various navigation calculations based on the inertial information Ib that was corrected using the bias error B.

Here, [k, i] are indexes for identifying the calculation results P, C, where "k" represents the time k, and "i" represents the scan number i. That is, $P[k, i]$ and $C[k, i]$ are common in the pixels in the same scanning line. The motion compensation block 110 compensates the latest data values $Lr[k, i, j]$, $\theta r[k, i, j]$, and $\psi r[k, i, j]$ for the movement amount of the vehicle 3 which varies depending on the scan number i in the global shutter frame Fo by the following formula 2 using the calculation results $P[k, i]$ and $C[k, i]$. As a result, the motion compensation block 110 calculates the 3-D polar coordinate $R[k, i, j]$ as shown in the formula 2 for each pixel of each scan line. The calculated 3-D polar coordinates $R[k, i, j]$ are stored in the memory 10 in association with the time k as the latest data values of the reflected wave image Ir that was compensated for the movement amount of the vehicle 3. Hereinafter, the movement amount of the vehicle 3 during the global shutter frame Fo is referred to as the vehicle movement amount.

$$R[k, i, j] = Lr[k, i, j] \cdot C[k, i] \cdot \begin{bmatrix} \cos\theta r[k, i, j] \cdot \cos\psi r[k, i, j] \\ \cos\theta r[k, i, j] \cdot \sin\psi r[k, i, j] \\ \sin\theta r[k, i, j] \end{bmatrix} + P[k, i] \quad \text{[Formula 2]}$$

The latest reflected wave image Ir and the previous reflected wave image Ir which were stored in the memory 10 after the compensation for the vehicle movement amount by the motion compensation block 110 are input to (read by) the change amount calculation block 120. According to the inputs, the change amount calculation block 120 calculates the change amount per unit time ΔR[k, i, j] of the reflected wave image Ir during the global shutter frame Fo. Specifically, the change amount calculation block 120 compares, by the following formula 3, the 3-D polar coordinates R having common indexes excepting for the time k of the latest reflected wave image Ir and the previous reflected wave image Ir which were acquired at the successive global shutter frames Fo having different stat timings. As a result, the change amount calculation block 120 calculates the change amount per unit time ΔR that is the derivative value for each pixel.

$$\Delta R[k,i,j] = R[k,i,j] - R[k-1,i,j] \quad \text{[Formula 3]}$$

Here, in the above formula 3, ΔR[k, i, j] is defined as the difference between R[k, i, j] in the global shutter frame Fo having the start time k and R[k−1, i, j] in the global shutter frame Fo having the start time k−1. The change amount calculation block 120 uses the 3-D polar coordinate R[k, i, j] calculated in the current synchronization process using the correction and the compensation by the blocks 100, 110 and the 3-D polar coordinate R[k−1, i, j] in the previous synchronization process calculated using the correction and the compensation by the blocks 100, 110. However, in the initial synchronization process after the vehicle 3 is started, the change amount calculation block 120 uses the 3-D polar coordinate R[k−1, i, j] calculated by the correction and the compensation by the blocks 100, 110 performed before the initial synchronization process together with the 3-D polar coordinate R[k, j] calculated in the initial synchronization process.

The latest change amount ΔR[k, i, j] per unit time calculated by the change amount calculation block 120 is input to the image estimation block 130 shown in FIG. 2. The latest reflected wave image Ir which was stored in the memory 10 after the compensation for the vehicle movement amount by the motion compensation block 110 is input to (read by) the change image estimation block 130. Further, the latest synchronization error time T that was predicted by the synchronization prediction block 180 and stored in the memory 10 is input to (read by) the change amount calculation block 120 as described later.

Figure 7:
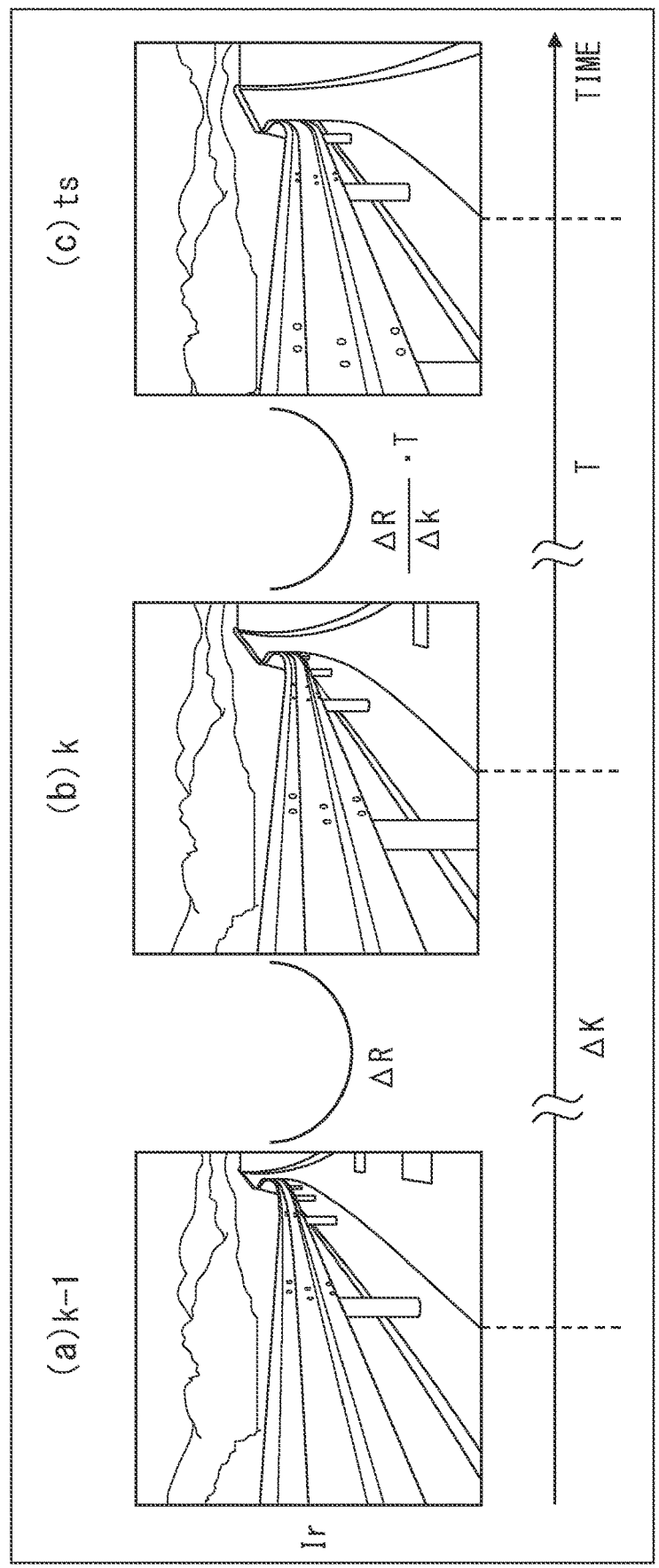
FIG. 7 is a schematic diagram for explaining a change amount calculation block and an image estimation block according to the first embodiment.

According to these inputs, the image estimation block 130 sets, as a synchronization timing ts shown in FIG. 7, the timing shifted by the latest synchronization error time T from the time k (that is, the time k+T), where the time k is the start timing of the global shutter frame Fo. FIG. 7 shows the outside view captured in the reflected wave image Ir in a case where the sign of the synchronization error time T is positive (+), but does not show the reflected wave image Ir as it is. The image estimation block 130 estimates the reflected wave image Ir at the synchronization timing ts based on the change amount ΔR[k, i, j] per unit time at the time k. Specifically, the image estimation block 130 converts the 3-D polar coordinates R[k, i, j] of the latest reflected wave image Ir by the following formula 4 using the change amount ΔR[k, i, j] per unit time and the synchronization error time T. As a result, the image estimation block 130 calculates the estimated polar coordinates Rp[k, i, j] of the reflected wave image Ir at the synchronization timing ts for each pixel.

$$Rp[k, i, j] = R[k, i, j] + \frac{\Delta R[k, i, j]}{\Delta k} \cdot T \quad \text{[Formula 4]}$$

Here, in the formula 4, the coordinates Rp[k, i, j] at the synchronization timing ts is estimated by the coordinates R[k, i, j] in the global shutter frame Fo having the start time k, the change amount ΔR[k, i, j] at the time k, the synchronization error time T, and the frame period Δk of the global shutter frame Fo. The image estimation block 130 generates the reflected wave image Ir that includes the estimated polar coordinates Rp[k, i, j] at the synchronization timing ts as the estimated data values.

As shown in FIG. 2, the difference extraction block 140 includes the sub-block 142 configured to preprocess the reflected wave image Ir, the sub-block 144 configured to preprocess the outside light image Io, and the sub-block 146 configured to compare these preprocessed images Ir, Io.

The position P[k, 1] of the position P[k, i] calculated by the motion compensation block 110 and the direction cosine matrix C[k, 1] of the direction cosine matrix C[k, i] calculated by the motion compensation block 110 are input to the sub-block 142 of the difference extraction block 140. Further, the reflected wave image Ir at the synchronization timing ts estimated by the image estimation block 130 is input to the sub-block 142.

According to these inputs, the sub-block 142 compensates the reflected wave image Ir for the error from the time k that is the start timing of the global shutter frame Fo. Specifically, the sub-block 142 converts, to the 3-D rectangular coordinate Rr[k, i, j] represented by the following formula 5, the estimated polar coordinate Rp[k, j] calculated by the image estimation block 130 as the estimated data value of the reflected wave image Ir at the synchronization timing ts for each pixel.

$$Rr[k,i,j] = C^T[k,1] \cdot Rp[k,i,j] \quad \text{[Formula 5]}$$

In the formula 5, the 3-D rectangular coordinate Rr[k, i, j] is defined by the transposed matrix CT[k, 1] that is the transpose of the direction cosine matrix C[k, 1] at the time k that is the start timing of the global shutter frame Fo, and the estimated polar coordinate Rp[k, i, j] of the global shutter frame Fo. The sub-block 142 compensates, by the formula 6 using the position P[k, 1] at the time k, the 3-D rectangular coordinate Rr[k, i, j] of each pixel that is the latest data value of the converted reflected wave image Ir for the difference between the time h and the time k. As a result, the sub-block 142 calculates the relative rectangular coordinates x, y, z defined by the formula 6 as information about the relative position of the reflected point of the laser light corresponding to each pixel viewed from the vehicle 3 at the time k.

$$\begin{bmatrix} x \\ y \\ z \end{bmatrix} = Rr[k, i, j] - P[k, 1] \quad \text{[Formula 6]}$$

The sub-block 142 further converts the calculated relative rectangular coordinates x, y, z of each pixel by the following formulas 7-9. As a result, the sub-block 142 calculates the distance value Lr[k, i, j], the beam steering angle θr[k, i, j], and ψr[k, i, j] as the latest data values of the reflected wave image Ir that was compensated for the error according to the time k.

$$Lr[k, i, j] = \sqrt{x^2 + y^2 + z^2} \quad \text{[Formula 7]}$$

-continued $$\theta r[k, i, j] = \tan^{-1} \frac{z}{\sqrt{x^2 + y^2}} \qquad \text{[Formula 8]}$$

$$\Psi r[k, i, j] = \tan^{-1} \frac{y}{x} \qquad \text{[Formula 9]}$$

Figure 8:
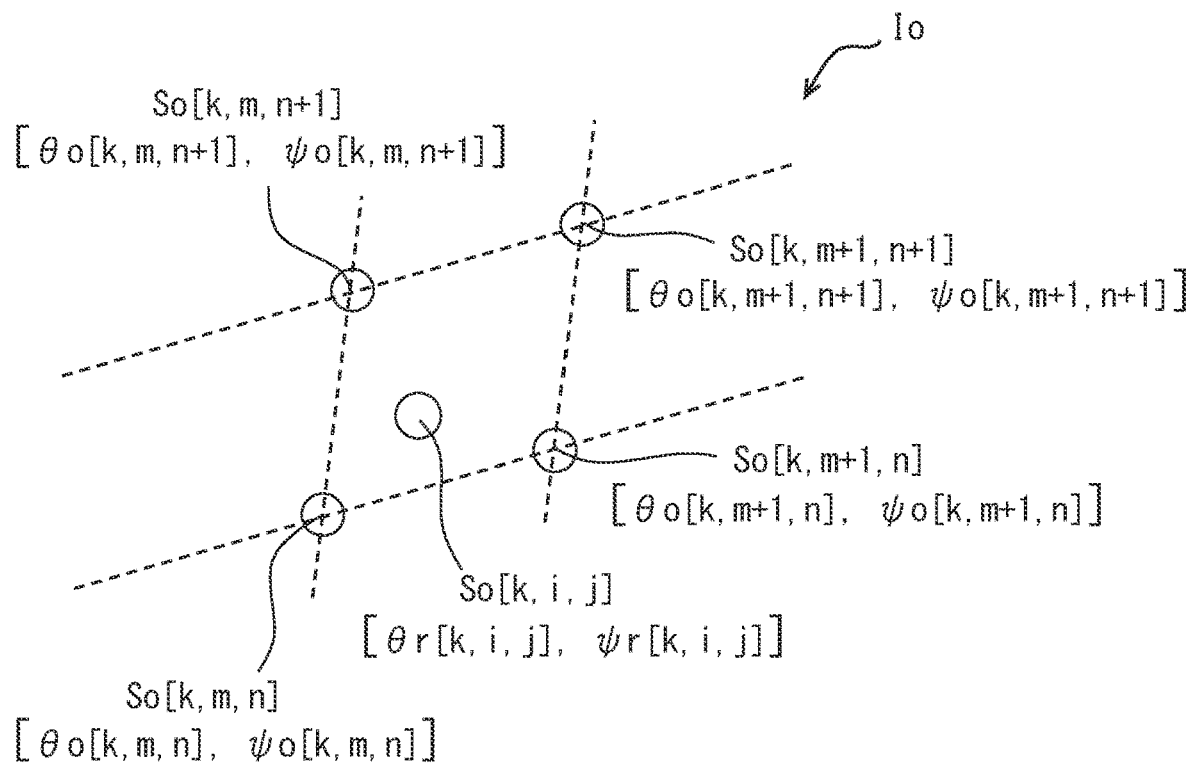
FIG. 8 is a schematic diagram for explaining a difference extraction block according to the first embodiment.

The beam steering angle θr[k, i, j] and ψr[k, i, j] which are the latest data values of the reflected wave image Ir calculated by the sub-block 142 are input to the sub-block 144 of the difference extraction block 140 shown in FIG. 2. The latest outside light image Io acquired by the external camera 24 in the global shutter frame Fo whose start timing is the time k is also input to the sub-block 144. As shown in FIG. 8, the latest outside light image Io includes, as the latest data values for each pixel, the luminance value So[k, m, n], the pixel angles θo[k, m, n], and ψo[k, m, n].

Here, [k, m, n] are indexes for identifying the latest data values So, θo, ψo, where "k" is the time k, "m" is the scan number m representing the row number, and the pixel number n in the scan number m. The maximum value of the scan number m for the outside light image Io is larger than the maximum value of the scan number i for the reflected wave image Ir, and the maximum value of the pixel number n for the outside light image Io is larger than the maximum value of the pixel number j for the reflected wave image Ir. That is, the outside light image Io is generated as a high-resolution image having a larger number of pixels than the reflected wave image Ir.

Figure 9:
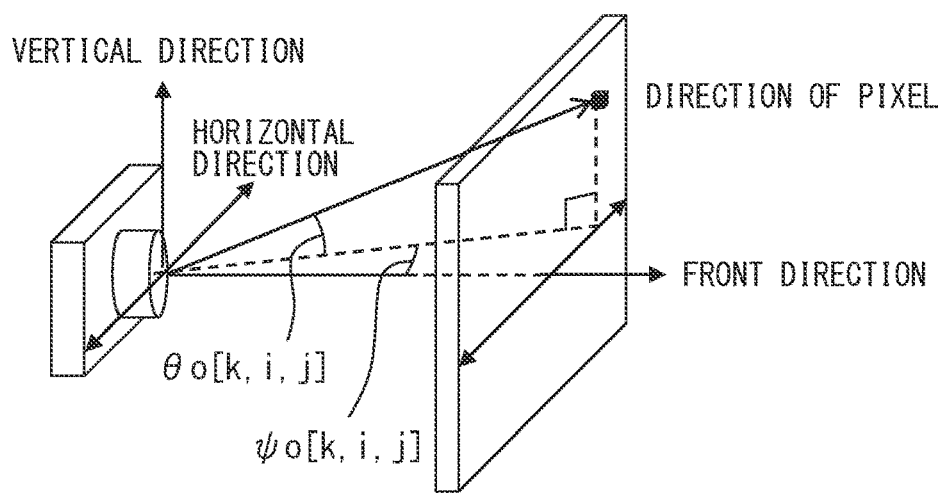
FIG. 9 is a schematic diagram for explaining the difference extraction block according to the first embodiment.

As shown in FIG. 9, θo[k, m, n] represents the pixel angle in the vertical direction of the outside light sensed by the pixel having the numbers m, n of the imaging element 241 at the time k. The ψo[k, m, n] represents the pixel angle in the horizontal direction of the outside light sensed by the pixel having the numbers m, n of the imaging element 241 at the time k.

According to these inputs, the sub-block 144 performs the interpolation to match the high-resolution one of the reflected wave image Ir and the outside light image Io to the low-resolution one. That is, the sub-block 144 performs the interpolation to match the high-resolution outside light image Io to the low-resolution reflected wave image Ir. Specifically, the sub-block 144 searches the pixel angles θo, ψo that satisfy the following formulas 10, 11 for the beam steering angles θr[k, i, j], ψ[k, i, j] of each pixel as shown in FIG. 8.

$$\theta o[k,m,n] < \theta r[k,i,j] \leq \theta o[k,m+1,n] \qquad \text{[Formula 10]}$$

$$\Psi o[k,m,n] < \Psi r[k,i,j] \leq \Psi o[k,m,n+1] \qquad \text{[Formula 11]}$$

In the formula 10, the indexes of the horizontally adjacent pixels are represented as [k, m, n] and [k, m+1, n]. In the above formula 10, the searching range for the beam steering angle θr[k, i, j] is defined by the θo[k, m, n] and the θo[k, m+1, n]. In the formula 11, the indexes of the vertically adjacent pixels are represented as [k, m, n] and [k, m, n+1]. In the above formula 11, the searching range for the pixel angle ψr[k, i, j] is defined by the pixel angles ψo[k, m, n] and ψo[k, m, n+1]. The sub-block 144 is configured to calculate the luminance values So[k, j] of the pixel of the outside light image Io corresponding to the beam steering angle θr[k, i, j] and ψr[k, i, j] for each pixel by the interpolation using the following formulas 12-14.

$$S1 = \frac{\theta r[k, i, j] - \theta o[k, m, n]}{\theta o[k, m+1, n] - \theta o[k, m, n]} \cdot \qquad \text{[Formula 12]}$$

$$(So[k, m+1, n] - So[k, m, n])$$

$$S2 = \frac{\theta r[k, i, j] - \theta o[k, m, n+1]}{\theta o[k, m+1, n+1] - \theta o[k, m, n+1]} \cdot \qquad \text{[Formula 13]}$$

$$(So[k, m+1, n+1] - So[k, m, n+1])$$

$$So[k, i, j] = \frac{\Psi r[k, i, j] - \Psi o[k, m, n]}{\Psi o[k, m, n+1] - \Psi o[k, m, n]} \cdot (S2 - S1) + S1 \qquad \text{[Formula 14]}$$

In the formula 12, the indexes of the horizontally adjacent pixels are represented as [k, m, n] and [k, m+1, n]. In the formula 12, the valuable S1 is defined by the pixel angles θo[k, m, n], θo[k, m+1, n], the corresponding luminance values So[k, m, n], So[k, m+1, n], and the beam steering angle θr[k, i, j].

In the formula 13, the indexes of the vertically adjacent pixels are represented as [k, m, n] and [k, m, n+1]. In the formula 13, the indexes of the pixel vertically adjacent to the pixel having the indexes of [k, m+1, n] which is horizontally adjacent to the pixel having the indexes of [k, m, n] are represented by [k, m+1, n+1] (see FIG. 8). That is, in the formula 13, the indexes of the pixel horizontally adjacent to the pixel having the indexes of [k, m, n+1] which is vertically adjacent to the pixel having the indexes of [k, m, n] are represented by [k, m+1, n+1] (see FIG. 8). In the formula 13, the valuable S2 is defined by the pixel angles θo[k, m, n+1], θo[k, m+1, n+1], the corresponding luminance values So[k, m, n+1], So[k, m+1, n+1], and the beam steering angle θr[k, i, j].

In the formula 14, the indexes of the vertically adjacent pixels are represented as [k, m, n] and [k, m, n+1]. In the formula 14, the luminance value So[k, i, j] of the interpolated outside light image Io is defined by the pixel angles ψo[k, m, n], ψo[k, m, n+1], the valuables S1, S2 of the formulas 12, 13, and the beam steering angle ψr[k, i, j].

The distance value Lr[k, i, j] is input to the sub-block 146 of the difference extraction block 140 shown in FIG. 2 as the latest data value of the reflected wave image Ir calculated by the sub-block 142. According to this input, the sub-block 146 extracts edges in the latest reflected wave image Ir by at least one of various filtering processing to the distance value Lr[k, i, j]. As a result, the sub-block 146 calculates the difference in the distance values Lr[k, i, j] of the horizontally or vertically adjacent pixels as an edge image value Lre[k, i, j] for each pixel corresponding to the extracted edges.

The luminance value So[k, i, j] is input to the sub-block 146 as the latest data value of the outside light image Io which was interpolated by the sub-block 144. According to this input, the sub-block 146 extracts edges in the latest outside light image Io by at least one of various filtering processing to the luminance value So[k, i, j]. As a result, the sub-block 146 calculates the difference in the luminance values So[k, i, j] of the horizontally or vertically adjacent pixels as an edge image value Soe[k, i, j] for each pixel corresponding to the extracted edges.

The sub-block 146 extracts the difference E[k, i, j] between the images Io, Ir by comparing the edge image values Lre[k, i, j] and Soe[k, i, j] of the reflected wave image Ir and the outside light image Io for each pixel. Specifically, the sub-block 146 calculates the difference E[k, i, j] between the images by comparing the edge image value Lre[k, i, j] with the edge image value Soe[k, i, j] having the same index after normalizing by the variance range respectively. That is, the sub-block 146 normalizes the edge image value Lre[k, i, j] of the reflected wave image Ir and the edge image value Soe[k, i, j] of the outside light image Io based on each variance range, and then compares the edge image values to extract the difference.

$$E[k, i, j] = \frac{Lre[k, i, j]}{Lremax[k, i, j] - Lremin[k, i, j]} - \frac{Soe[k, i, j]}{Soemax[k, i, j] - Soemin[k, i, j]} \quad \text{[Formula 15]}$$

In the first term on the right-hand side of the above formula 15, the Lremax[k, j] is the maximum value of the edge image value Lre[k, i, j] of the reflected wave image Ir, and the Lremin[k, i, j] is the minimum value of the edge image value Lre[k, j] of the reflected wave image Ir. In the first term on the right-hand side of the above formula 15, the edge image value Lre[k, i, j] is normalized (made dimensionless) using the variance range calculated by subtracting the minimum value Lremin[k, i, j] from the maximum value Lremax[k, i, j].

In the second term on the right-hand side of the above formula 15, Soemax[k, i, j] is the maximum value of the edge image value Soe[k, i, j] of the outside light image Io, and the Soemin[k, i, j] is the minimum value of the edge image value Soe[k, i, j] of the outside light image Io. In the second term on the right-hand side of the above formula 15, the edge image value Soe[k, i, j] is normalized (made dimensionless) using the variance range calculated by subtracting the minimum value Soemin[k, i, j] from the maximum value Soemax[k, i, j].

The difference E[k, i, j] between the latest images Io, Ir extracted by the sub-block 146 of the difference extraction block 140 is input to the determination block 160 shown in FIG. 2. According to this input, the determination block 160 determines, based on the difference E[k, i, j], whether to return the synchronization process to the step of predicting the synchronization error time T by the synchronization prediction block 180.

When the sum of squares of the difference E[k, i, j] between the edges of corresponding pixels is within the acceptable range, it is assumed that the prediction of the synchronization error time T is accurate, and then the determination block 160 determines that the return is unnecessary. When it is determined that the return is unnecessary, the synchronization error time T is used for the motion estimation of the vehicle 3, for example, and then the synchronization of the radar sensor 22 and the external camera 24 is realized. Hereinafter, the sum of squares of the difference E[k, i, j] of each pixel is referred to as the sum of squares of the difference E[k, i, j].

When the sum of squares of the difference E[k, i, j] is out of the acceptable range, it is assumed that the prediction of the synchronization error time T is inaccurate, and then the determination block 160 determines that the return is necessary. When it is determined that the return is necessary, the synchronization error time T is predicted again by the synchronization prediction block 180.

A numerical range at or below a threshold value which is an upper limit of the acceptable difference E[k, i, j] may be set as the acceptable range that is the determination criterion used by the synchronization prediction block 180. A numerical range below a threshold value which is a lower limit of the unacceptable difference E[k, i, j] may be set as the acceptable range.

In response to the determination that an initial synchronization process is required after the vehicle 3 is started, the initial value of the synchronization error time T stored in the memory 10 is input to (read by) the synchronization prediction block 180 shown in FIG. 2. According to this input, the synchronization prediction block 180 provisionally predicts the latest synchronization error time T at time k and stores the synchronization error time T to the memory 10. The initial value of the synchronization error time T may be a preset constant value. The initial value of the synchronization error time T may be a variable value predicted in the past synchronization process.

When the determination block 160 determines that the return is necessary, the inaccurate synchronization error time T is input to (read by) the synchronization prediction block 180 from the memory 10. According to this input, the synchronization prediction block 180 predicts the latest synchronization error time T at the time k by adding the error adjusting value to the inaccurate synchronization error time T, and stores it to the memory 10. At this time, the synchronization prediction block 180 adjusts the sign and the difference of the error adjusting value from the initial value according to the difference between the sum of squares of the difference E[k, i, j] extracted this time and the sum of squares of the difference extracted in previous time. When it is determined that the return is necessary, the initial value of the error adjusting value stored in the memory 10 is also input to (read by) the synchronization prediction block 180. The initial value of the error adjusting value may be a preset constant value. The initial value of the error adjusting value may be a variable value predicted in the past synchronization process.

In the above first embodiment, the motion compensation block 110 corresponds to a motion compensation unit, the change amount calculation block 120 corresponds to a change amount calculation unit, and the image estimation block 130 corresponds to an image estimation unit. In the first embodiment, the difference extraction block 140 corresponds to a difference extraction unit, the determination block 160 corresponds to a determination unit, and the synchronization prediction block 180 corresponds to a synchronization prediction unit.

Figure 10:
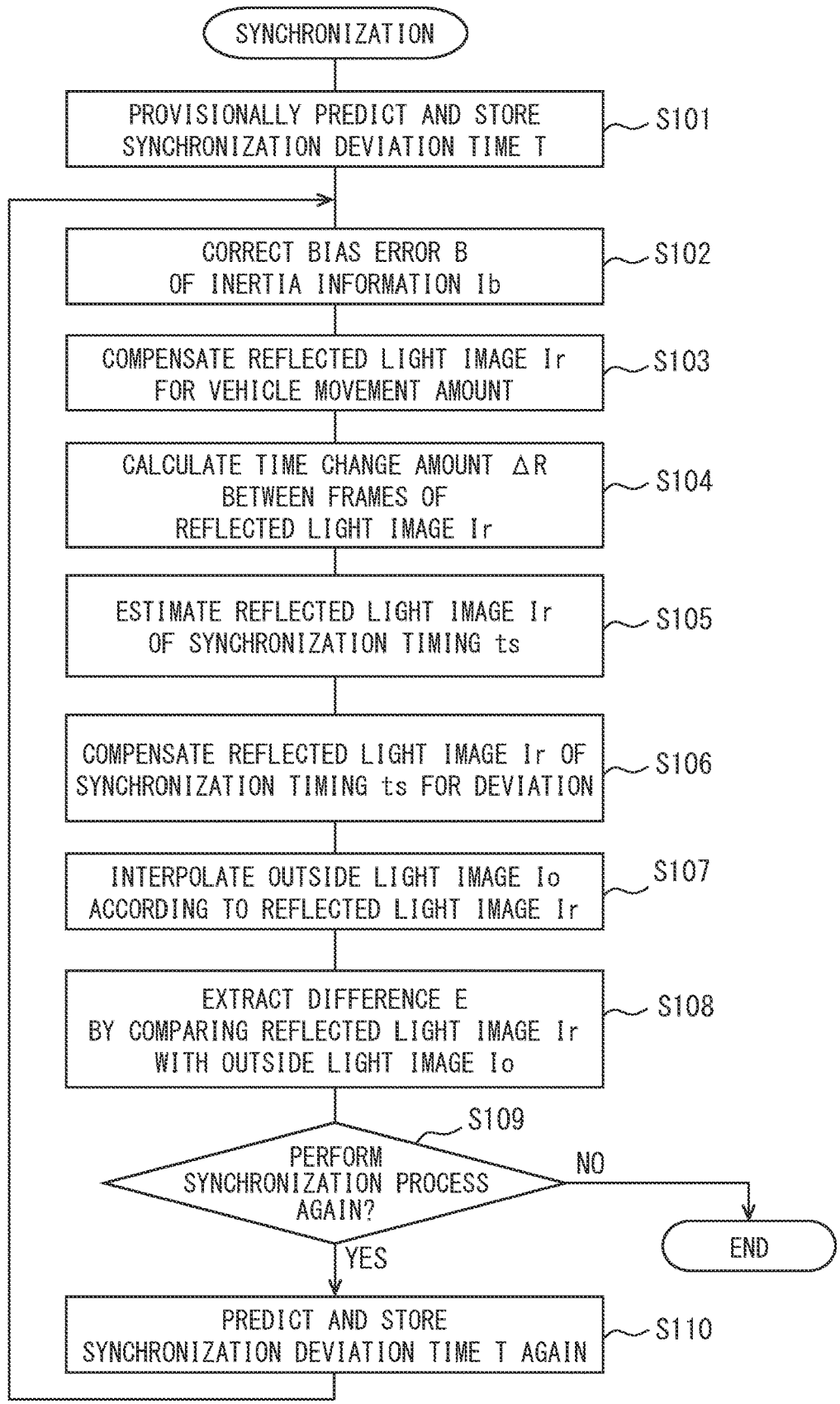
FIG. 10 is a flowchart illustrating a synchronization method according to the first embodiment.

The process of the synchronization method realized by the synchronization device 1 using the functional blocks 100, 110, 120, 130, 140, 160, 180 will be described with reference to FIG. 10. This process is performed for each global shutter frame Fo repeated after the vehicle 3 starts traveling. Further, in this flow, "S" means steps of the process executed by instructions included in the synchronization program. Moreover, the indexes are omitted in the following description.

In S101, the synchronization prediction block 180 provisionally predicts, as the initial value stored in the memory 10, the synchronization error time T between the radar sensor 22 and the external camera 24 at the time k when the global shutter frame Fo is started.

In S102, the error correction block 100 corrects the latest bias error B of the latest inertial information Ib acquired by the inertial sensor 20 at the time k. In S103, the motion compensation block 110 compensates the latest reflected wave image Ir acquired by the radar sensor 22 in the global shutter frame Fo having the start time k for the vehicle movement amount in the global shutter frame Fo. The compensation is performed based on the inertial information Ib corrected by the bias error B in S102.

In S104, the change amount calculation block 120 calculates the change amount ΔR per unit time in the global shutter frame Fo between the latest reflected wave image Ir and the previous reflected wave image Ir in which the vehicle movement amount is compensated. Before the initial synchronization process after the vehicle 3 is started, the correction similar to S101 and the correction similar to S102 are performed, and thus the 3-D polar coordinate R used for the calculation of the change amount ΔR is calculated.

In S105, the image estimation block 130 estimates the reflected wave image Ir at the synchronization timing ts which is shifted from the start time k of the global shutter frame Fo by the latest synchronization timing T predicted in S101 or S110 described later. The image estimation is performed based on the change amount ΔR per unit time calculated in S104.

In S106, the sub-block 142 of the difference extraction block 140 compensates the reflected wave image Ir at the synchronization timing ts estimated in S105 for the deviation from the time k which is the start timing of the global shutter frame Fo.

In S107, the sub-block 144 of the difference extraction block 140 interpolates the latest outside light image Io acquired by the external camera 24 in the global shutter frame Fo starting at the time k to match the reflected wave image Ir compensated in S106. The interpolation is performed to match the high-resolution outside light image Io to the low-resolution reflected wave image Ir.

In S108, the sub-block 146 of the difference extraction block 140 extracts the difference E by comparing the reflected wave image Ir compensated in S106 with the outside light image Io interpolated in S107. The comparison and the difference extraction are performed on the edges after the image values Lre, Soe regarding the edges of the reflected wave image Ir and the outside light image Io are normalized using the variance ranges.

In S109, the determination block 160 determines whether to return the synchronization process to the step of predicting the synchronization error time T based on the difference E extracted in S108. When it is determined that the return is unnecessary, this process is terminated.

In contrast, when it is determined that the return is necessary, in S110, the synchronization prediction block 180 predicts the synchronization error time T at the time k again and stores it to the memory 10, and then S102 is executed again. The re-prediction is realized by adjusting, based on the difference between the difference E extracted in the current synchronization process and the difference E extracted in the previous synchronization process, the error adjusting value that is added to the inaccurate synchronization error time T.

In the above first embodiment, S101, S110 correspond to a prediction process, S103 corresponds to a compensation process, and S104 corresponds to a calculation process. Further, in the first embodiment, S105 corresponds to an estimation process, S106, S107, S108 correspond to an extraction process, and S109 corresponds to a determination process.

Effects

Hereinbelow, effects of the above first embodiment will be described.

According to the synchronization process of the first embodiment, the reflected wave image Ir for the synchronization timing ts that is shifted from the start timing of the global shutter frame Fo of the external camera 24 by the synchronization error time T between the radar sensor 22 and the external camera 24 is estimated based on the change amount ΔR of the reflected wave image Ir in the global shutter frame Fo. As the more accurate the prediction of the synchronization error time T is, the smaller the difference E extracted by comparing the reflected wave image Ir at the synchronization timing ts with the the outside light image Io at the synchronization timing ts. Since it is determined whether to return the synchronization process to the step of predicting the synchronization error time T based on the difference E between the reflected wave image Ir and the outside light image Io, the synchronization process may be repeated until the synchronization error time T is accurately predicted. Accordingly, the radar sensor 22 and the external camera 24 can be accurately synchronized with each other.

In the first embodiment, the reflected wave image Ir is compared with the outside light image Io after the reflected wave image Ir is compensated for the deviation from the start timing of the global shutter frame Fo. Accordingly, the reflected wave image Ir acquired in the global shutter frame Fo can be compensated to be the reflected wave image Ir acquired at the start timing of the global shutter frame Fo together with the outside light image Io. That is, since the compensated reflected wave image Ir can be assumed to be substantially acquired at the same time as the outside light image Io, the difference E is accurately extracted by comparing the images Ir, Io with each other, and accordingly the radar sensor 22 and the external camera 24 can be accurately synchronized with each other.

According to the first embodiment, the reflected wave image Ir is compensated for the vehicle movement amount in the global shutter frame Fo before the change amount in the reflected wave image Ir in the global shutter frame is calculated. Accordingly, the change amount ΔR per unit time is calculated after the reflected wave image Ir is compensated for the vehicle movement amount which may vary during the global shutter frame Fo (specifically, vary for each rolling shutter frame Fr). Accordingly, the difference between the outside light image Io and the reflected wave image Ir at the synchronization timing is predicted based on the change amount ΔR per unit time can be accurately extracted, and then the radar sensor 22 and the external camera 24 can be accurately synchronized with each other.

According to the first embodiment, the reflected wave image Ir and the outside light image Io are compared with each other after the interpolation for matching the high-resolution one to the low-resolution one. Accordingly, since the difference E can be accurately extracted by comparing the images Ir, Io after eliminating the non-matching between the images Ir, Io, the radar sensor 22 and the external camera 24 can be accurately synchronized with each other.

According to the first embodiment, the edges of the reflected wave image Ir and the outside light image Io are compared with each other. Since the difference E can be accurately extracted from the edges that can be easily compared with each other, the radar sensor 22 and the external camera 24 can be accurately synchronized with each other.

According to the first embodiment, the reflected wave image Ir and the outside light image Io are compared with each other after normalizing the image values Lre, Soe by the variance ranges. Accordingly, since the difference E can be accurately extracted by comparing the image values Lre, Soe with each other after scaling as a result of the normalization, the radar sensor 22 and the external camera 24 can be accurately synchronized with each other.

Second Embodiment

Figure 11:
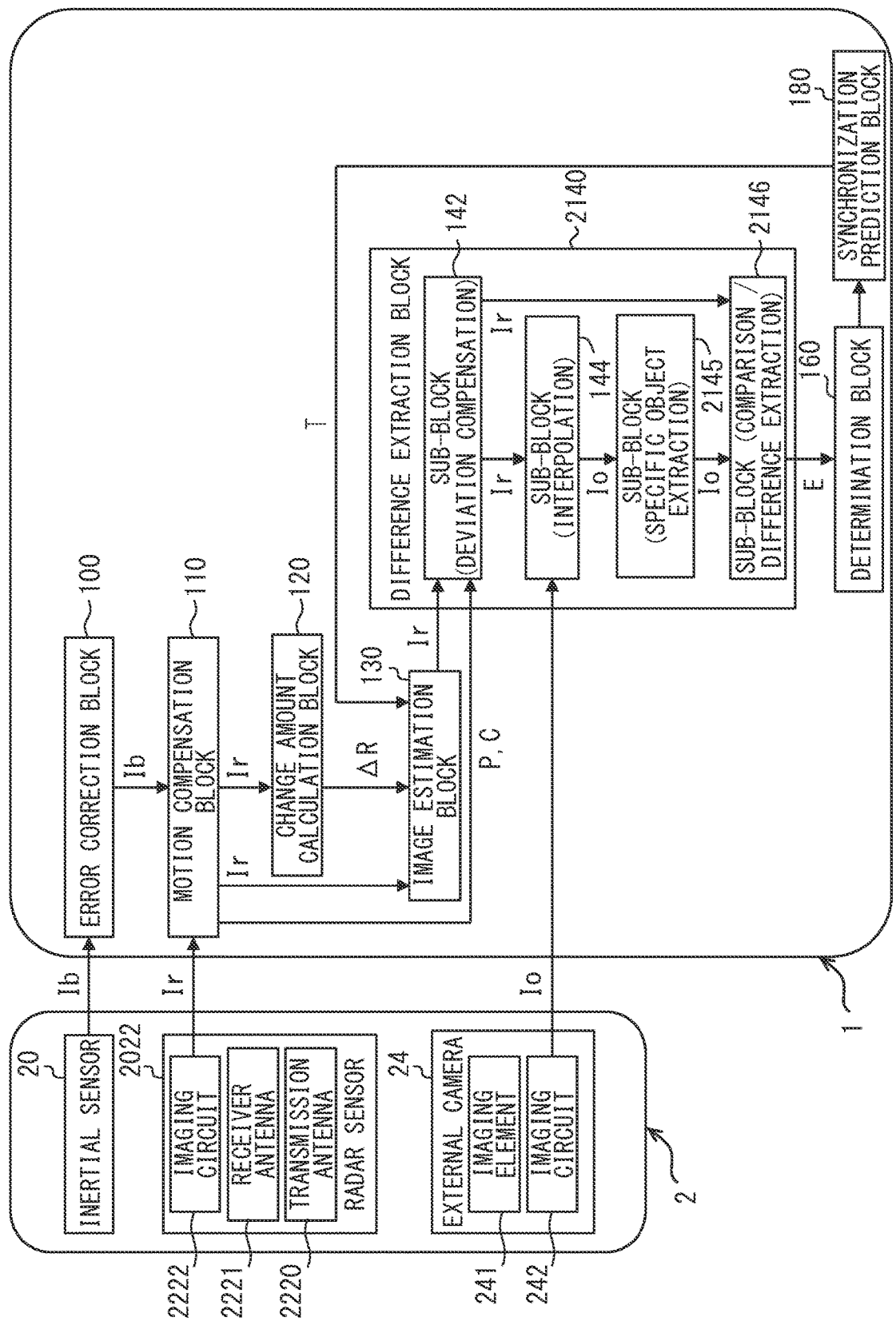
FIG. 11 is a block diagram showing a detailed configuration of a synchronization device according to a second embodiment.

A second embodiment shown in FIG. 11 is a modification of the first embodiment.

A radar sensor 2022 of the second embodiment is a so-called imaging radar configured to acquire a reflected wave image Ir that can be utilized for the motion estimation of the vehicle 3, for example. The radar sensor 2022 is configured to acquire the reflected wave image Ir according to the reflected waves from the outside of the vehicle 3 obtained by emitting the millimeter waves (radio wave) as the electromagnetic waves. The radar sensor 2022 includes a transmission antenna 2220, a receiver antenna 2221, and the imaging circuit 2222.

The imaging circuit 2222 is configured to control the millimeter waves emitted as the electromagnetic waves to the outside of the vehicle 3 in the form of a pulsed beam from the transmission antennas 2220 arranged in an array. Along with the emission of the millimeter waves, the imaging circuit 2222 scans the horizontally adjacent pixel lines corresponding to the receiver antennas 2221 arranged in an array. The imaging circuit 2222 is configured to acquire the reflected wave image Ir by converting, to data for each pixel associating with corresponding beam steering angle, a distance value to the reflected point corresponding to the time of flight of the reflected light. The time of flight of the reflected light is calculated from the time when the millimeter waves are emitted and the time when the reflected wave is sensed.

A difference extraction block 2140 of the second embodiment includes a sub-block 2145 configured to perform a preprocessing on the outside light image Io. The outside light image Io interpolated by the sub-block 144 is input to the sub-block 2145. According to this input, the sub-block 2145 extracts a specific object having a high-capturing rate by the radar sensor 2022 from the interpolated outside light image Io.

Ideally, the specific object having a high-capturing rate by the radar sensor 2022 is a corner part distant from the vehicle 3 in an object existing in the outside. The specific object having a high-capturing rate by the radar sensor may be a part of an object that can be easily captured by the radar sensor 2022. However, it may be difficult to tell, from the outside light image Io, a corner part of an object distant from the vehicle 3 from a corner part close to the vehicle 3. Accordingly, the sub-block 2145 extracts both the distant corner part and the close corner part from the outside light image Io.

According to the second embodiment, the difference extraction block 2140 includes a sub-block 2146 configured to compare the preprocessed images Ir, Io with each other instead of the sub-block 146 of the first embodiment. The luminance value So[k, i, j] is input to the sub-block 146 as the latest data value that is the feature of the specific object extracted from the outside light image Io by the sub-block 2145.

Regarding the functions other than this input, the sub-block 2146 realizes the same functions as the sub-block 146 of the first embodiment. As a result, the specific objects (the corner part) captured in the reflected wave image Ir and the outside light image Io are compared with each other.

Figure 12:
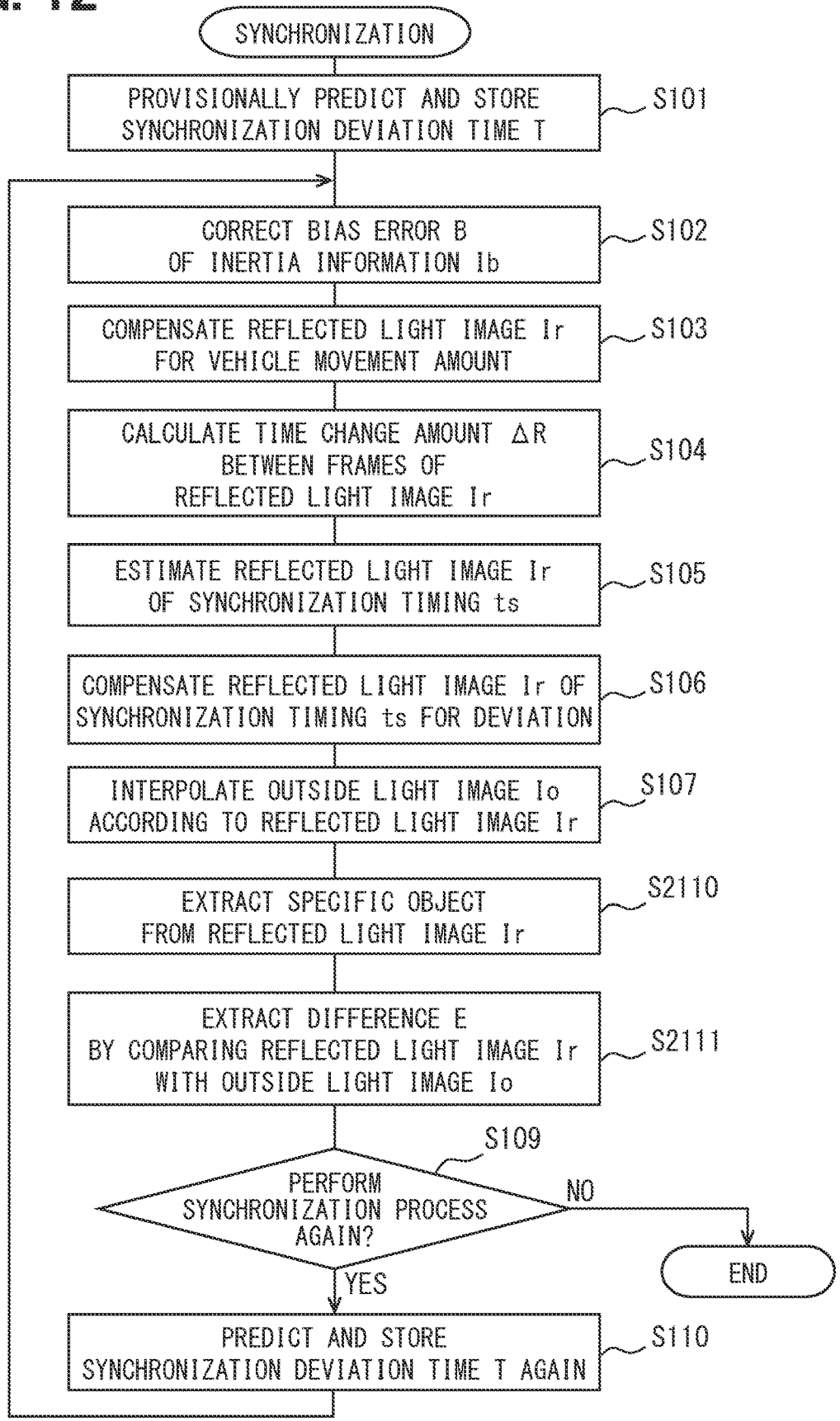
FIG. 12 is a flowchart illustrating a synchronization method according to the second embodiment.

In the process performed by the synchronization device 1 according to the second embodiment, S2110 and S2111 are performed in order instead of S108 of the first embodiment as shown in FIG. 12. In S2110, the sub-block 2146 of the difference extraction block 2140 extracts the specific object having a high-capturing rate by the radar sensor 2022 from the outside light image Io interpolated in S107.

In S2111, the sub-block 2146 of the difference extraction block 2140 extracts the difference E by comparing the reflected wave image Ir compensated in S106 with the specific object extracted from the outside light image Io interpolated in S2110. The comparison and the difference extraction are performed on the edges after the image values Lre, Soe regarding the edges of the specific objects in the reflected wave image Ir and the outside light image Io are normalized using the variance ranges.

In the second embodiment, the difference extraction block 2140 corresponding to the difference extraction unit, and S106, S107, S2110, S2111 correspond to the extraction process.

According to the above described second embodiment, the same effects as the first embodiment can be obtained with the radar sensor 2022 configured to emit the millimeter waves as the electromagnetic waves instead of the radar sensor 22 of the first embodiment configured to emit the infrared laser light as the electromagnetic waves to the outside of the vehicle 3.

Other Embodiments

Although multiple embodiments have been described above, the present disclosure is not construed as being limited to these embodiments, and can be applied to various embodiments and combinations within a scope that does not depart from the gist of the present disclosure.

The synchronization device 1 of the modification may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In one modification, the error correction block 100 and S102 may be omitted. In this case, in the motion compensation block 110 and S103, the vehicle movement amount may be compensated based on the latest inertial information Ib acquired by the inertial sensor 20 at the time k.

In one modification, in the sub-block 142 of the difference extraction block 140, 2140 and S106, the outside light image Io may be compensated for the deviation from the time k in the reflected wave image Ir. In one modification, the reflected wave image Ir may be a high-resolution image compared to the outside light image Io. In this case, the sub-block 144 of the difference extraction block 140, 2140 and S107, the interpolation may be performed to match the high-resolution reflected wave image Ir to the low-resolution outside light image Io.

In one modification, in the sub-blocks 142, 146, 2146 of the difference extraction block 140, 2140, S106, S108, and S2111, the luminance value or the intensity value included in the reflected wave image Ir in association with the distance value Lr may be used instead of the distance value Lr. In one modification, in the sub-blocks 146, 2146 of the difference extraction block 140, 2140, S108 and S2111, the distance value Lr of the reflected wave image Ir and the luminance value So of the outside light image Io may be used as the image values for the comparison and the difference extraction. In one modification, in the sub-blocks 146, 2146 of the difference extraction block 140, 2140, S108 and S2111, the luminance values So of the reflected wave image Ir and the outside light image Io may be used for the comparison and the difference extraction after normalizing to match one to another.

In one modification, the radar sensor 22 may be configured to acquire the reflected wave image Ir in the global shutter mode. In this case, the blocks 100, 110, 142, S102, S103, and S106 may be omitted. Further, in this case, in the sub-block 144 and S107, the high-resolution one of the latest images Ir, Io acquired in the global shutter frame Fo may be interpolated to match to the low-resolution one. Moreover, in this case, in the sub-block 146 and S108, the latest images Ir, Io acquired in the global shutter frame Fo may be compared with each other.

What is claimed is:

1. A synchronization device configured to perform a synchronization process for a radar sensor and an external camera mounted in a vehicle, the radar sensor being configured to acquire a reflected wave image according to reflected waves obtained by emitting electromagnetic waves, the external camera being configured to acquire an outside light image according to outside light sensed from an outside of the vehicle, the synchronization device comprising:
    a synchronization prediction unit configured to predict a synchronization error time between the radar sensor and the external camera;
    a change amount calculation unit configured to calculate a change amount of the reflected wave image in a shutter frame of the external camera;
    an image estimation unit configured to estimate, based on the change amount calculated by the change amount calculation unit, the reflected wave image for a synchronization timing that is shifted from a start timing of the shutter frame by the synchronization error time predicted by the synchronization prediction unit;
    a difference extraction unit configured to extract a difference between the reflected wave image for the synchronization timing estimated by the image estimation unit and the outside light image by comparing the reflected wave image for the synchronization timing with the outside light image; and
    a determination unit configured to determine, based on the difference extracted by the difference extraction unit, whether to return the synchronization process to a step of predicting the synchronization error time.

2. The synchronization device according to claim 1, wherein
    the difference extraction unit is configured to compensate the reflected wave image for a deviation from the start timing of the shutter frame before comparing the reflected wave image with the outside light image.

3. The synchronization device according claim 2, further comprising:
    a motion compensation unit configured to compensate the reflected wave image for a movement amount of the vehicle in the shutter frame before the change amount calculation unit calculates the change amount.

4. The synchronization device according to claim 1, wherein
    the difference extraction unit is configured to perform an interpolation to match a high-resolution one of the reflected wave image and the outside light image to a low-resolution one of the reflected wave image and the outside light image before comparing the reflected wave image with the outside light image.

5. The synchronization device according to claim 1, wherein
    the difference extraction unit is configured to compare an edge in the reflected wave image with an edge in the outside light image.

6. The synchronization device according to claim 1, wherein
    the difference extraction unit is configured to:
        normalize an image value of the reflected wave image by a variance range of the image value of the reflected wave image and normalize an image value of the outside light image by a variance range of the image value of the outside light image; and
        compare the image value of the reflected wave image with the image value of the outside light image.

7. A method for performing a synchronization process for a radar sensor and an external camera mounted in a vehicle, the radar sensor being configured to acquire a reflected light image according to reflected waves obtained by emitting electromagnetic waves, the external camera being configured to acquire an outside light image according to outside light sensed from an outside of the vehicle, the method comprising:
    predicting a synchronization error time between the radar sensor and the external camera;
    calculating a change amount of the reflected wave image in a shutter frame of the external camera;
    estimating, based on the calculated change amount, the reflected wave image for a synchronization timing that is shifted from a start timing of the shutter frame by the predicted synchronization error time;
    extracting a difference between the estimated reflected wave image for the synchronization timing and the outside light image by comparing the estimated reflected wave image for the synchronization timing with the outside light image; and
    determining, based on the extracted difference, whether to return the synchronization process to a step of predicting the synchronization error time.

8. The method according to claim 7 further comprising:
    compensating the estimated reflected wave image for a deviation from the start timing of the shutter frame before extracting the difference.

9. The method according to claim 8 further comprising:
    compensating the reflected wave image for a movement amount of the vehicle in the shutter frame before calculating the change amount of the reflected wave image.

10. The method according to claim 7 further comprising:
    performing an interpolation to match a high-resolution one of the estimated reflected wave image and the outside light image to a low-resolution one of the estimated reflected wave image and the outside light image before extracting the difference.

11. The method according to claim 7, wherein
    in extracting the difference, an edge in the estimated reflected wave image is compared with an edge in the outside light image.

12. The method according to claim 7 further comprising:
    normalizing an image value of the estimated reflected wave image by a variance range of the image value of the estimated reflected wave image; and
    normalizing an image value of the outside image by a variance range of the image value of the outside light image, wherein
    in extracting the difference, the normalized image value of the estimated reflected wave image is compared with the normalized image value of the outside image.

13. A computer program product stored on at least one non-transitory computer readable medium for performing a synchronization process for a radar sensor and an external camera mounted in a vehicle, the radar sensor being configured to acquire a reflected light image according to reflected waves obtained by emitting electromagnetic waves, the external camera being configured to acquire an outside light image according to outside light sensed from an outside of the vehicle, the computer program product comprising instructions configured to, when executed by at least one processor, cause the at least one processor to:

predict a synchronization error time between the radar sensor and the external camera;

calculate a change amount of the reflected wave image in a shutter frame of the external camera;

estimate, based on the calculated change amount, the reflected wave image for a synchronization timing that is shifted from a start timing of the shutter frame by the predicted synchronization error time;

extract a difference between the estimated reflected wave image for the synchronization timing and the outside light image by comparing the estimated reflected wave image for the synchronization timing with the outside light image; and determine, based on the extracted difference, whether to return the synchronization process to a step of predicting the synchronization error time.

14. The computer program product according to claim 13, wherein the instructions are configured to, when executed by the at least one processor, further cause the at least one processor to:

compensate the estimated reflected wave image for a deviation from the start timing of the shutter frame before extracting the difference.

15. The computer program product according to claim 14, wherein the instructions are configured to, when executed by the at least one processor, further cause the at least one processor to:

compensate the reflected wave image for a movement amount of the vehicle in the shutter frame before calculating the change amount of the reflected wave image.

16. The computer program product according to claim 13, wherein the instructions are configured to, when executed by the at least one processor, further cause the at least one processor to:

perform an interpolation to match a high-resolution one of the estimated reflected wave image and the outside light image to a low-resolution one of the estimated reflected wave image and the outside light image before extracting the difference.

17. The computer program product according to claim 13, wherein the instructions are configured to, when executed by the at least one processor, further cause the at least one processor to:

compare an edge in the estimated reflected wave image with an edge in the outside light image to extract the difference between the estimated reflected wave image and the outside light image.

18. The computer program product according to claim 13, wherein the instructions are configured to, when executed by the at least one processor, further cause the at least one processor to:

normalize an image value of the estimated reflected wave image by a variance range of the image value of the estimated reflected wave image;

normalize an image value of the outside image by a variance range of the image value of the outside light image; and compare the normalized image value of the estimated reflected wave image with the normalized image value of the outside image to extract the difference between the estimated reflected wave image and the outside light image.

\* \* \* \* \*